(12) United States Patent
Beck et al.

(10) Patent No.: US 11,744,266 B2
(45) Date of Patent: Sep. 5, 2023

(54) COATED PARTICLES

(71) Applicant: DSM IP ASSETS B.V., Heerlen (NL)

(72) Inventors: Markus Beck, Kaiseraugst (CH); Elger Funda, Kaiseraugst (CH); Simone König-Grillo, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 596 days.

(21) Appl. No.: 16/084,032

(22) PCT Filed: Mar. 15, 2017

(86) PCT No.: PCT/EP2017/056101
§ 371 (c)(1),
(2) Date: Sep. 11, 2018

(87) PCT Pub. No.: WO2017/158010
PCT Pub. Date: Sep. 21, 2017

(65) Prior Publication Data
US 2020/0288753 A1  Sep. 17, 2020

(30) Foreign Application Priority Data
Mar. 15, 2016  (EP) ..................... 16160379

(51) Int. Cl.
| A23L 2/58 | (2006.01) |
| A23L 5/44 | (2016.01) |
| A23L 5/30 | (2016.01) |
| A23P 10/40 | (2016.01) |
| A23P 20/18 | (2016.01) |
| A23L 2/39 | (2006.01) |

(52) U.S. Cl.
CPC .......... *A23L 2/58* (2013.01); *A23L 2/39* (2013.01); *A23L 5/32* (2016.08); *A23L 5/44* (2016.08); *A23P 10/40* (2016.08); *A23P 20/18* (2016.08); *A23V 2002/00* (2013.01)

(58) Field of Classification Search
CPC ...... A23L 2/58; A23L 5/32; A23L 2/39; A23P 10/30; A23P 20/18
USPC ........................................... 426/96
See application file for complete search history.

(56) References Cited

U.S. PATENT DOCUMENTS

| 5,023,095 | A | 6/1991 | Kirk | |
| 6,254,886 | B1 | 7/2001 | Fusca et al. | |
| 6,358,544 | B1 * | 3/2002 | Henry, Jr. | A23L 2/39 |
| | | | | 426/590 |
| 2007/0104750 | A1 | 5/2007 | Wilson et al. | |

FOREIGN PATENT DOCUMENTS

| AU | 2013311059 | * 6/2014 | ............... A23L 5/44 |
| CN | 1202804 | 12/1998 | |
| CN | 1719983 | 1/2006 | |
| CN | 101023140 | 8/2007 | |
| CN | 101212910 | 7/2008 | |
| CN | 101610683 | 12/2009 | |
| JP | 41-10978 | 6/1941 | |
| JP | 8-113665 | 5/1996 | |
| JP | 10-46041 | 2/1998 | |
| JP | 2004-514419 | 5/2004 | |
| JP | 2006-500935 | 1/2006 | |
| JP | 2009-513674 | 4/2009 | |
| KR | 10-2004-0043189 | 5/2004 | |
| WO | WO 03/015537 | 2/2003 | |

OTHER PUBLICATIONS

Bily et al, Heat and light colour stability of beverages coloured with a natural carotene emulsion: Effect of synthetic versus natural water soluble antioxidants, Food Research International 65 (2014) 149-155.*
Fuze Slenderize Blueberry Raspberry Beverage, H-E-B, Jun. 3, 2015 accessed at https://www.heb.com/product-detail/fuze-slenderize-blueberry-raspberry-beverage/1459489 (FUZE).*
Kuntz, Beta-Carotene That Doesn't Add Color Unveiled, Supermarket News, Nov. 12, 1984, accessed at https://www.supermarketnews.com/archive/beta-carotene-doesnt-add-color-unveiled.*
Notices of Reasons for Rejection for JP Patent Appln No. P2018-548411 dated Aug. 4, 2020 (with English-language translation).
International Search Report for PCT/EP2017/056101, dated May 18, 2017, 3 pages.
CN Appln. No. 201780017270.5, The First Office Action, dated Mar. 3, 2021.
BR Appln No. 112018068553-4, First Office Action with English-Language Translation dated Oct. 27, 2021.

* cited by examiner

*Primary Examiner* — Donald R Spamer
*Assistant Examiner* — Philip A Dubois
(74) *Attorney, Agent, or Firm* — NIXON & VANDERHYE P.C.

(57) ABSTRACT

The present patent application relates to novel red-orange coated particles, which are mainly used in (dry) formulations for instant beverages. The advantage of these coated particles is that they are red to orange as such (also in the formulations for instant beverages, wherein they can be identified by the naked eye as individual discrete colored particles), but upon dissolution of the instant beverage powder, the particles will dissolve as well and will not interfere with or change the intended color of the ready-to drink instant beverages made from the instant beverage dry powders.

5 Claims, No Drawings

COATED PARTICLES

CROSS-REFERENCE TO RELATED APPLICATIONS

This application is the U.S. national phase of International Application No. PCT/EP2017/056101 filed 15 Mar. 2017, which designated the U.S. and claims priority to EP Patent Application No. 16160379.0 filed 15 Mar. 2016, the entire contents of each of which are hereby incorporated by reference.

FIELD

The present patent application relates to novel red-orange coated water dispersible particles, which are mainly used in (dry) formulations for instant products such as but not limited to dry beverage powders. The advantage of these coated particles is that they are colored red-orange as such and as part of the instant beverage powder formulation, wherein they can be identified as individual discrete particles visible (by the naked human eye), but these particles will not interfere with the intended color of the reconstituted (dissolved) ready-to drink beverage made from the instant beverage powders. Furthermore, the present application relates to the use of these particles as well to their production.

BACKGROUND AND SUMMARY

Many kinds of coated particles are known. The field of application for such particles is very versatile.

The goal of the present invention was to provide colored and clearly visible individual particles, which comprise specific active ingredients and which are red-orange. Furthermore, these particles should be present and perceived as discrete colored particles by the naked eye when added to a dry formulation for instant beverage and these particles do not interfere with the color of the beverage upon dissolution of the instant beverage powder.

In other words, the ready to drink beverage will not be colored by these particles and a beverage of a specific intended color keeps that color. For example, a vanilla flavored drink will stay white to light yellow in color and will not be colored otherwise by the presence of colored nutrient particles which will dissolve together with the bulk of the instant beverage powder.

To obtain such particles there are several hurdles to overcome, for examples the following:
(i) the coated particles should be identifiable by the naked eye in the dry instant beverage formulation, which comprise (next to the coated particles) all the necessary ingredients for the application (such as i.e. sugar, flavor, other nutrients, etc. . . . ); and
(ii) the colored particles shall be soluble in the same way as the bulk ingredients of the instant powder i.e., the colored particles shall also be water dispersible/soluble and, furthermore, the solubility of the instant beverage powder should not be influenced negatively by the colored coated particles; and
(iii) the storage stability and shelf life of the instant powder should not be influenced negatively by the coated particles; and
(iv) the color of the ready to drink beverage shall not be influenced by the colored coated soluble particles; and
(v) the stability of the beverage should not be influenced negatively by the coated particles.

It has now been found that when a carrier material is coated with a specific β-carotene formulation, all the above listed advantages are achieved.

Therefore, the present invention relates to solid red-orange particles (SP) having
(a) a core and
(b) a coating layer, which comprises 0.1 weight-% (wt-%) to 30 wt-%, based on the total weight of the coating layer, of β-carotene,
characterised in that the β-carotene formulation used to form the coating layer has an $A_{1/1}$ value of up to 200.

DETAILED DESCRIPTION

The β-carotene, which is used in the present invention can be isolated from a β-carotene source or can be synthesised or it can be bought commercially (or any combination thereof).

The $A_{1/1}$ value is a well-defined and commonly used value, which characterises the color intensity of a carotenoid formulation. Depending on type of formulation, products even with same concentration of β-carotene may have different Aiii values.

It is usually measured as follows (all $A_{1/1}$ values in the present patent application are determined using this method):

Accurately weight approx. 220 mg of the β-carotene in a 100 ml volumetric flask, add 50 ml of distilled water at 50° C., and treat with ultrasonic. Cool the volumetric flask under cold running water and bring to volume with distilled water. Subdilute 10.00 ml of this suspension to 100.00 ml with distilled water. With a spectrophotometer measure the absorbance in a 1 cm cell at 492-496 nm (measure the maximum) against distilled water as a blank.

The following formula is used to obtain the $A_{1/1}$ value $$A1/1 \text{ value} = A(1\%, 1 \text{ cm}) = \frac{A_{max} \times 10}{B},$$

wherein B is the initial weight of the β-carotene (in gram).

The determination of the $A_{1/1}$ value is the first step of the production of the coated particles. β-carotene with the $A_{1/1}$ value of less than 200 are suitable.

Due to the fact, the particles are used in food applications (instant powder for beverages) all ingredients used must be food grade and used in allowed (and/or recommended) quantities.

The shape of the core as well as of the coated particles is also not an essential feature of the present invention. The shape can be sphere-like or any other form (also mixtures of shapes). Usually and preferably the particles are sphere-like.

The coating system according to the present invention is layered around the core. During the coating process, powder particles may also form agglomerates.

Usually (and ideally) the coating covers the whole surface of the particle. Furthermore, the layer is usually (and ideally) equally thick on the surface of the core.

The size of the core as well as the size of the coated particle is not an essential feature of the present invention.

The coated particles are usually of such a size that they are useful for their use in the instant powder for beverages. Particle size may be chosen in a way to ensure visibility by the naked eye, miscibility with the beverage powder and segregation stability i.e. the colored particles shall uniformly mix with the instant beverage powder and shall not separate upon mechanical impact such as handling, transportation and storage conditions.

A suitable size is between 50-1000 μm (preferably 100-900 μm); the size is defined by the diameter of the longest dimension of the particle and measured by commonly known method (like laser diffraction or sieve analysis).

All particle sizes are determined by laser diffraction technique using a "Mastersizer 3000" of Malvern Instruments Ltd., UK. Further information on this particle size characterization method can e.g. be found in "Basic principles of particle size analytics", Dr. Alan Rawle, Malvern Instruments Limited, Enigma Business Part, Grovewood Road, Malvern, Worcestershire, WR14 1XZ, UK and the "Manual of Malvern particle size analyzer". Particular reference is made to the user manual number MAN 0096, Issue 1.0, November 1994. If nothing else is stated all particle sizes referring are Dv90 values (volume diameter, 90% of the population resides below this point, and 10% resides above this point) determined by laser diffraction. The particle size can be determined in the dry form.

Therefore, the present invention also relates to solid particles (SP1), which are solid particles (SP), wherein the average particle size is 50-1000 μm.

Therefore, the present invention also relates to solid particles (SP1'), which are solid particles (SP), wherein the average particle size is 100-900 μm.

The solid red-orange particles according to the present invention consists of:
  (a) 60-99 wt-%, based on the total weight of the solid red particles, of core and
  (b) 1-40 wt-%, based on the total weight of the solid red particles, of coating layer, which comprises 0.1 wt-% to 30 wt-%, based on the total weight of the coating layer, of β-carotene, and wherein the β-carotene of the coating layer has an $A_{1/1}$ value of up to 200.

Therefore, the present invention also relates to solid red-orange particles (SP2), which are solid particles (SP), (SP1) or (SP1'), wherein the solid red-orange particles consists of:
  (a) 60-99 wt-%, based on the total weight of the solid red-orange particles, of core and
  (b) 1-40 wt-%, based on the total weight of the solid red-orange particles, of coating layer, which comprises 0.1 wt-% to 30 wt-%, based on the total weight of the coating layer, of β-carotene, and wherein the β-carotene of the coating layer has an $A_{1/1}$ value of up to 200.

Therefore, the present invention also relates to solid red-orange particles (SP2'), which are solid particles (SP), (SP1) or (SP1'), wherein the solid red-orange particles consists of:
  (a) 80-99 wt-%, based on the total weight of the solid red-orange particles, of core and
  (b) 1-20 wt-%, based on the total weight of the solid red-orange particles, of coating layer, which comprises 0.1 wt-% to 30 wt-%, based on the total weight of the coating layer, of β-carotene, and wherein the β-carotene of the coating layer has an $A_{1/1}$ value of up to 200.

Therefore, the present invention also relates to solid particles (SP2'''), which are solid red-orange particles (SP), (SP1) or (SP1'), wherein the solid red-orange particles consists of:
  (a) 90-99 wt-%, based on the total weight of the solid red-orange particles, of core and
  (b) 1-10 wt-%, based on the total weight of the solid red-orange particles, of coating layer, which comprises 0.1 wt-% to 30 wt-%, based on the total weight of the coating layer, of β-carotene, and wherein the β-carotene of the coating layer has an $A_{1/1}$ value of up to 200.

All percentages always add up to 100.

The core can be formed from a pure compound or a mixture of compounds. Suitable core materials are sugars and oligo- or polysaccharides (such as sucrose, glucose, dried glucose syrups, maltodextrins and the like).

Preferably the core is formed from sugar(s).

Therefore, the present invention also relates to solid particles (SP3), which are solid particles (SP), (SP1), (SP1'), (SP2), (SP2') or (SP2''), wherein the core can be formed from a pure compound or a mixture of compounds.

Therefore, the present invention also relates to solid particles (SP3'), which are solid particles (SP), (SP1), (SP1'), (SP2), (SP2'), (SP2'') or (SP3), wherein the core is formed from at least compound chosen from the group consisting of sugars and oligo- or polysaccharides (such as sucrose, glucose, dried glucose syrups or maltodextrins).

Therefore, the present invention also relates to solid particles (SP3''), which are solid particles (SP), (SP1), (SP1'), (SP2), (SP2'), (SP2''), (SP3) or (SP3'), wherein the core is formed from at least one sugar.

It is possible to add any further ingredients into the core, which do not influence the overall properties of the solid red-orange particles.

Therefore, the present invention also relates to solid particles (SP4), which are solid particles (SP), (SP1), (SP1'), (SP2), (SP2'), (SP2''), (SP3), (SP3') or (SP3''), wherein the core comprises further ingredients, which do not influence the overall properties of the solid red-orange particles.

The coating layer comprises the specific β-carotene formulation. The coating layer can be formed purely from β-carotene formulation (100 wt %), based on the total weight of the coating layer.

Therefore, the present invention also relates to solid particles (SP5), which are solid particles (SP), (SP1), (SP1'), (SP2), (SP2'), (SP2''), (SP3), (SP3'), (SP3'') or (SP4), wherein coating is formed purely from β-carotene formulation (100 wt %, based on the total weight of the coating layer).

If less than 100 wt-% of β-carotene formulation is used then the other ingredients can be any kind of ingredient, which is needed.

The β-carotene formulation typically comprises 0.1-30 wt-%, based on the total weight of the coating layer, of β-carotene.

Therefore, the present invention also relates to solid particles (SP6), which are solid particles (SP), (SP1), (SP1'), (SP2), (SP2'), (SP2''), (SP3), (SP3'), (SP3'') or (SP4), wherein the β-carotene formulation (of the coating layer) comprises 0.1-30 wt-%, based on the total weight of the coating layer, of β-carotene.

It is possible to add active compounds to the coating layer which fulfil specific technological or nutritive purposes and which are an important ingredient or constituent of the beverage.

Depending on the type of the beverage that can be a variety of compounds.

An important type of beverage is a sport drink. In the context of the present invention a sport drink is a beverage which has the purpose to help athletes replace water, electrolytes, and energy after training or competition, as well as energy drink is a type of beverage containing stimulant drugs, which is marketed as providing mental and physical stimulation. Other types of drinks can represent and promote specific health effects such as heart health, bone health, brain health, immunity, prevention of oxidative stress, healthy ageing, eye health, improvement of cognition and the like.

Suitable ingredients, which could be part of the coating layer, which are commonly used in sport drinks as well as in energy drinks are i.e. vitamins, minerals and amino acids such as L-carnitine, taurine etc. To add such ingredients to the coating has the advantage that the mixing of the instant powder is simplified and that the nutritive compound is homogeneously distributed as part of the bulk instant beverage powder.

Therefore, the present invention also relates to solid particles (SP7), which are solid particles (SP), (SP1), (SP1'), (SP2), (SP2'), (SP2"), (SP3), (SP3'), (SP3"), (SP4) or (SP6), wherein the coating layer comprises at least one further compound chosen from the group consisting of vitamins, minerals and amino acids (such as L-carnitine or taurine).

The amount of these ingredients (active compounds), which are useful to be incorporated into an instant powder, can vary significantly.

The amount of those ingredients can be up to 80 wt-%, based on the total weight of the coating layer.

Therefore, the present invention also relates to solid particles (SP7'), which are solid particles (SP7), wherein the further compound is present in an amount of up to 80 wt-%, based on the total weight of the coating layer.

Furthermore, the coating could also comprise some auxiliary compounds (such as flavors, fillers, film-forming compounds, etc), The amount of those auxiliary compound can be up to 20 wt-%, based on the total weight of the coating layer.

Therefore, the present invention also relates to solid particles (SP8), which are solid particles (SP), (SP1), (SP1'), (SP2), (SP2'), (SP2"), (SP3), (SP3'), (SP3"), (SP4), (SP6), (SP7) or (SP7'), wherein the coating layer comprises at least one further auxiliary compound chosen from the group consisting of flavors, fillers and film-forming compounds.

Therefore, the present invention also relates to solid particles (SP8'), which are solid particles (SP), wherein the coating layer comprises at least one further auxiliary compound is present in an amount of up to 20 wt-%, based on the total weight of the coating layer.

The coated particles (SP), (SP1), (SP1'), (SP2), (SP2'), (SP2"), (SP3), (SP3'), (SP3"), (SP4), (SP5), (SP6), (SP7), (SP7'), (SP8) and (SP8') are produced by commonly known processes.

The first step of the production process is the determination of the $A_{1/1}$ value as described above. It is the essential feature of the coated particles that the $A_{1/1}$ value of the β-carotene formulation used to form the coating layer has an $A_{1/1}$ value of up to 200 (less than 200).

Therefore the present invention also relates to a process of production (P) of the coated particle (SP), (SP1), (SP1'), (SP2), (SP2'), (SP2"), (SP3), (SP3'), (SP3"), (SP4), (SP5), (SP6), (SP7), (SP7'), (SP8) or (SP8'), wherein is a first step the $A_{1/1}$ value of the β-carotene formulation (used to form the coating layer) is determined by weighting 220 mg of the β-carotene in a 100 ml volumetric flask, adding 50 ml of distilled water at 50° C., and treating the solution with ultrasonic; afterward cooling the volumetric flask under cold running water and bringing to volume with distilled water; afterwards subdilute 10.00 ml of this suspension to 100.00 ml with distilled water; then measuring the absorbance with a spectrophotometer in a 1 cm cell at 492-496 nm (measure the maximum) against distilled water as a blank and then calculating the $A_{1/1}$ value by the following formula $$A(1\%, 1\ cm) = \frac{A_{max} \times 10}{B},$$

wherein B is the initial weight of the β-carotene (in gram).

When a $A_{1/1}$ value of less than 200 is obtained the β-carotene is then used for the further steps.

In the further steps, the β-carotene, which has a $A_{1/1}$ value of less than 200 is used to coat the core.

Therefore the present invention also relates to a process of production (P1) of the coated particle (SP), (SP1), (SP1'), (SP2), (SP2'), (SP2"), (SP3), (SP3'), (SP3"), (SP4), (SP5), (SP6), (SP7), (SP7'), (SP8) or (SP8'), which is process (P), wherein the β-carotene, which has a $A_{1/1}$ value of less than 200 is used to coat the core material.

In the process according to the present invention the core material (especially sugar) is coated with an aqueous solution, which comprises all the ingredients of the coating layer (β-carotene and optionally at least one active compound and optionally at least one auxiliary compound) by spray coating technology. Typical coating technologies are fluid-bed coating (esp. top-spray, bottom-spray or Wurster coating) or drum coating.

Therefore, the present invention also relates to a process of production (P2), which is process (P) or (P1), wherein the core material is coated with an aqueous solution, which comprises all the ingredients of the coating layer (β-carotene and optionally at least one active compound and optionally at least one auxiliary compound) by spray coating technology.

Therefore, the present invention also relates to a process of production (P2'), which is process (P2), wherein fluid-bed coating (esp. top-spray, bottom-spray or Wurster coating) or drum coating is used to produce the coated particles.

Therefore, the present invention also relates to a process of production (P2"), which is process (P2), wherein top-spray, bottom-spray or Wurster coating is used to produce the coated particles.

Due to the fact, the particles (SP), (SP1), (SP1'), (SP2), (SP2'), (SP2"), (SP3), (SP3'), (SP3"), (SP4), (SP5), (SP6), (SP7), (SP7'), (SP8) and/or (SP8') are used in food applications (instant powder for beverages) all ingredients used must be food grade and used in allowed (and/or recommended) quantities.

The red-orange coated particles (SP), (SP1), (SP1'), (SP2), (SP2'), (SP2"), (SP3), (SP3'), (SP3"), (SP4), (SP5), (SP6), (SP7), (SP7'), (SP8) and/or (SP8') are used especially in instant powders for beverages (especially instant powders for sports and/or energy drinks). These instant powders are usually dissolved in water (or other commonly used liquids such as milk), which can have any temperature.

Therefore, the present invention also relates to the use the red-orange coated particles (SP), (SP1), (SP1'), (SP2), (SP2'), (SP2"), (SP3), (SP3'), (SP3"), (SP4), (SP5), (SP6), (SP7), (SP7'), (SP8) and/or (SP8') are used especially in an instant powder for beverages.

It is also possible to use other prepared liquids (which comprise already a certain amount of ingredients). This means that this liquid can contain certain ingredients and that the red-orange coated particles (SP), (SP1), (SP1'), (SP2), (SP2'), (SP2"), (SP3), (SP3'), (SP3"), (SP4), (SP5), (SP6), (SP7), (SP7'), (SP8) and/or (SP8') are added to this liquid. This is usually done by using a two (or more) compartment container.

To produce an instant powder, the red-orange coated particles (SP), (SP1), (SP1'), (SP2), (SP2'), (SP2"), (SP3), (SP3'), (SP3"), (SP4), (SP5), (SP6), (SP7), (SP7'), (SP8) and/or (SP8') are mixed with the other ingredients, which are needed or desired for the instant beverage powder.

The amount of the reddish coated particles (SP), (SP1), (SP1'), (SP2), (SP2'), (SP2"), (SP3), (SP3'), (SP3"), (SP4), (SP5), (SP6), (SP7), (SP7'), (SP8) and/or (SP8') in the instant powder can vary. It depends on the (final) amount of all the ingredients (of reddish coated particles) needed in the beverage, it also depends on the concentration of these ingredients in the reddish coated particles.

The present invention also relates to an instant beverage powder (especially an instant sport drink powder or an instant energy drink powder) comprising reddish coated particles (SP), (SP1), (SP1'), (SP2), (SP2'), (SP2"), (SP3), (SP3'), (SP3"), (SP4), (SP5), (SP6), (SP7), (SP7'), (SP8) and/or (SP8').

A usual concentration of β-carotene in a beverage is between 0.5-20 ppm. This means that the amount in the instant powder is such that the concentration of the β-carotene in the (prepared, liquid and ready to drink) beverage is between 0.5-20 ppm. The amount depends on the serving size of the (prepared, liquid and ready to drink) beverage.

As stated above the instant powder comprising the coated particles according to the present invention;
  (a) will not develop a color in the reconstituted ready to drink beverage on its own (e.g. vanilla flavored drinks will stay white light yellowish); and
  (b) will not disturb the intrinsic color of the reconstituted ready to drink beverage that goes along with the flavor (e.g. lime will stay yellow-greenish, grape and black currant will stay reddish-violet blueberry will stay blueish).

As a measure, the color strength (c) and the color hue angle of (a) and (b) are measured with a Hunter Ultrascan Colorimeter (in transmission or reflection mode).

To show the desired effect the instant beverage with and without the coated particles according to the present invention are measure and compared. The delta in color strength (c) is <10 and the delta in color hue angle (h) is <5.

The invention is illustrated by the following Example. All temperatures are given in ° C. and all parts and percentages are related to the weight.

Example 1: Production of the Particles 3.74 g L-Carnitine, 0.17 g Taurine and 1.33 g of a β-Carotene formulation containing 15%β-carotene (A (1%, 1 cm) at the maximum max 25) were dissolved in 50 g water. The solution was sprayed on 200 g crystal sugar in a lab-scale fluid-bed processor with Wurster technology at a product temperature of 60° C. After spraying the product was dried at 60° C. 165 g of red powder particles were obtained.

Example 2: Application (in Beverages)

1 g of the powder described above are mixed with 99 g of a commercial instant beverage powder. The red powder is clearly visible as red spots in the mixture. 60 g of the mixture are dissolved in 250 g water. A turbid solution is obtained. No color shift is observed compared to a solution of instant beverage powder without added red particles.

The invention claimed is:

1. A method of preparing a vanilla, lime, grape or blueberry flavored ready-to-drink liquid beverage having an intrinsic color of a white light-yellowish color, a yellow-greenish color, a reddish-violet color or a blueish color respectively corresponding to the vanilla, lime, grape or blueberry flavor of the liquid beverage, wherein the method comprises:
  (i) providing a beverage liquid having a predetermined beverage flavor and a respective intrinsic color corresponding to the beverage flavor, wherein the beverage liquid is selected from the group consisting of a vanilla flavored liquid beverage having an intrinsic white light yellowish color, a lime flavored beverage liquid having an intrinsic yellow-greenish color, a grape flavored beverage liquid having an intrinsic reddish-violet color and a blueberry flavored beverage liquid having an intrinsic blueish color,
  (ii) providing a beverage powder which is comprised of solid spray-dried red-orange colored dry particles having a size of 50-1000 μm which are comprised of:
    (a) a core, and
    (b) a coating layer surrounding the core, wherein the coating layer is comprised of 0.1 wt-% to 30 wt-%, based on the total weight of the coating layer, of β-carotene having an $A_{1/1}$ value of up to 200, and
  (iii) adding the beverage powder to the beverage liquid in an amount to achieve a β-carotene concentration of between 0.5-20 ppm without the red-orange color of the particles thereof affecting the respective intrinsic color of the beverage liquid.

2. The method according to claim 1, wherein the solid spray-dried red-orange colored dry particles have a size of 100-900 μm.

3. The method according to claim 1, wherein the solid spray-dried red-orange colored dry particles consist of:
  (a) 60-99 wt-%, based on the total weight of the solid red-orange colored dry particles, of the core, and
  (b) 1-40 wt-%, based on the total weight of the solid red-orange colored dry particles, of the coating layer.

4. The method according to claim 1, wherein the coating layer comprises at least one further auxiliary compound in an amount of up to 20 wt. %, based on the total weight of the coating layer.

5. The method according to claim 1, wherein the intrinsic color of the liquid beverage after addition of the beverage powder has a change in color strength (c) of less than 10 and a change in hue angle (h) of less than 5 as compared to the intrinsic color of the beverage liquid before the addition of the beverage powder.

* * * * *